US011420647B2

(12) United States Patent
Wyffels

(10) Patent No.: US 11,420,647 B2
(45) Date of Patent: Aug. 23, 2022

(54) ENHANCED STATIC OBJECT CLASSIFICATION USING LIDAR

(71) Applicant: Argo AI, LLC, Pittsburgh, PA (US)

(72) Inventor: Kevin L. Wyffels, Livonia, MI (US)

(73) Assignee: ARGO AI, LLC, Pittsburgh, PA (US)

(*) Notice: Subject to any disclaimer, the term of this patent is extended or adjusted under 35 U.S.C. 154(b) by 111 days.

(21) Appl. No.: 16/993,093

(22) Filed: Aug. 13, 2020

(65) Prior Publication Data

US 2022/0048530 A1    Feb. 17, 2022

(51) Int. Cl.
*B60W 60/00* (2020.01)
*G06K 9/62* (2022.01)

(52) U.S. Cl.
CPC ......... *B60W 60/001* (2020.02); *G06K 9/6268* (2013.01); *B60W 2420/52* (2013.01)

(58) Field of Classification Search
CPC .... B60W 60/001; G01S 17/89; G01S 17/931; G01S 17/86; G01S 13/931; G05D 1/0094; G05D 1/024; G01C 21/3833; H04L 47/29; G06K 9/62
See application file for complete search history.

(56) References Cited

U.S. PATENT DOCUMENTS

| | | | |
|---|---|---|---|
| 9,297,899 B2 | 3/2016 | Newman et al. | |
| 10,884,131 B1* | 1/2021 | Allais | G01S 17/86 |
| 2013/0332112 A1* | 12/2013 | Nakamura | G01S 17/931 |
| | | | 702/181 |
| 2016/0162742 A1 | 6/2016 | Rogan | |
| 2017/0185089 A1 | 6/2017 | Mei et al. | |
| 2018/0024239 A1 | 1/2018 | Branson | |
| 2018/0067491 A1 | 3/2018 | Oder et al. | |
| 2018/0203124 A1 | 7/2018 | Izzat et al. | |

(Continued)

FOREIGN PATENT DOCUMENTS

| | | | | |
|---|---|---|---|---|
| CN | 101160848 B | * | 2/2013 | ....... H04L 29/06027 |
| CN | 107316048 A | * | 11/2017 | ........... G06K 9/6269 |
| EP | 3633404 A1 | * | 4/2020 | ............. G01S 13/58 |

OTHER PUBLICATIONS

Asvadi et al. "3D LiDar-Based Static and Moving Obstacle Detection in Driving Environments: An Approach Based on Voxels and Multi-Region Ground Planes", Robotics and Autonomous Systems, Sep. 2016, pp. 299-311, vol. 83, Institute of Systems and Robotics, Department of Electrical and Computer Engineering, University of Coimbra, Coimbra, Portugal.

(Continued)

*Primary Examiner* — Yuri Kan, P.E.
(74) *Attorney, Agent, or Firm* — Sterne Kessler Goldstein & Fox P.L.L.C.

(57) ABSTRACT

Devices, systems, and methods are provided for classifying detected objects as static or dynamic. A device may determine first light detection and ranging (LIDAR) data associated with a convex hull of an object at a first time, and determine second LIDAR data associated with the convex hull at a second time after the first time. The device may generate, based on the first LIDAR data and the second LIDAR data, a vector including values of features associated with the first convex hull and the second convex hull. The device may determine, based on the vector, a probability that the object is static. The device may operate a machine based on the probability that the object is static.

20 Claims, 7 Drawing Sheets

(56) References Cited

U.S. PATENT DOCUMENTS

| | | |
|---|---|---|
| 2018/0203447 A1 | 7/2018 | Wyffels |
| 2018/0211103 A1* | 7/2018 | Sohn ..................... G05D 1/024 |
| 2018/0285658 A1 | 10/2018 | Gunther et al. |
| 2018/0314253 A1 | 11/2018 | Mercep et al. |
| 2019/0303759 A1 | 10/2019 | Farabet et al. |
| 2021/0001891 A1* | 1/2021 | Majithia ............ G01C 21/3833 |
| 2021/0080589 A1* | 3/2021 | Febbo .................. G05D 1/0094 |
| 2021/0192788 A1* | 6/2021 | Diederichs ............. G01S 17/89 |

OTHER PUBLICATIONS

International Search Report and Written Opinion of the International Searching Authority directed to related International Patent Application No. PCT/US2021/045990, dated Dec. 7, 2021; 6 pages.

* cited by examiner

ENHANCED STATIC OBJECT CLASSIFICATION USING LIDAR

TECHNICAL FIELD

This disclosure generally relates to systems and methods for classification of objects using sensor data.

BACKGROUND

Sensors increasingly are being used in a variety of applications to control machines. Sensor data may be used to identify objects whose locations may affect the operation of machines. Some techniques to identify static objects may be computationally inefficient and may result in inaccurate classification of moving objects as static objects. There is therefore a need for enhanced static object detection using sensor data to facilitate operation of machines.

Figure 1:
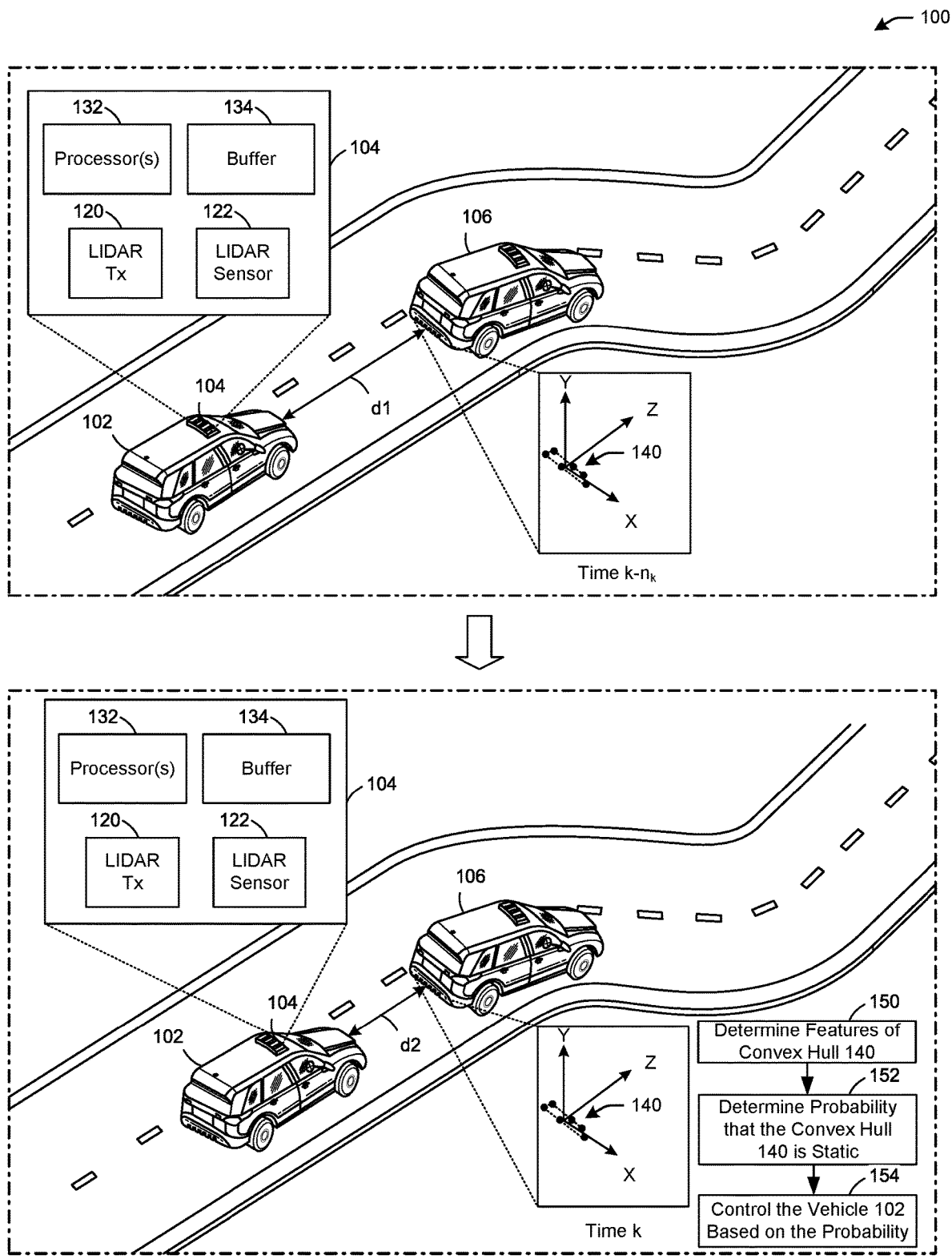
FIG. 1 illustrates an example system for static object classification, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for enhanced static object detection using light detection and ranging (LiDAR) data.

Sensors using different modalities may be implemented to control a variety of equipment, machines, autonomous vehicles, and the like. For example, LiDAR sensors may be used to detect objects and object distances from LiDAR sensors. Control of an autonomous vehicle may rely, at least in part, on an ability to detect objects and their locations with respect to the vehicle.

The operation of moving machines, such as autonomous vehicles, may depend on the detection of objects, many of which are static (e.g., non-moving), such as parked or stopped vehicles, signage, vegetation, and the like. Some techniques for classifying detected objects as static objects may be computationally inefficient and may result in false positives, which may negatively impact the control of a machine whose operation may depend on the detection of objects and classification of the objects as moving or static.

For example, some point cloud registration techniques may identify a rigid body transform between LiDAR detections at different times, and may compare the transform to a static object hypothesis to determine whether the transform is indicative of a static object. Such point cloud registration techniques may be computationally expensive and time consuming. Some techniques may include extracting a stable point feature from LiDAR detections at different times (e.g., a centroid of a convex hull), and may compare the motion of the point feature to a static object hypothesis. Such centroid-based techniques may be less computationally expensive than the point cloud registration techniques, but in practice, the extraction of a same point feature from LiDAR data at different times may be unreliable due to partial occlusion of sensors, changing viewpoint as objects move, and point sparsity (e.g., due to instability of LiDAR-only features).

Therefore, there is a need to enhance the detection and classification of static objects to facilitate the control of machines.

In one or more embodiments, an enhanced approach to static object classification using LiDAR sensor data may strike a favorable balance between runtime and accuracy, reducing the computational time and resources of some existing techniques, and improving the static object identification accuracy of some techniques. The enhanced approach may compare stable features over time. For example, a computer system may identify features using LiDAR data, may aggregate the features into a vector, and may determine a probability that an object identified using LiDAR data is static.

In one or more embodiments, a computer system may maintain a buffer with detected LiDAR object data tagged with a single frame between buffer entries (e.g., adjacent buffer entries may represent LiDAR detections at different times in sequential order, representing the locations of objects in multiple frames over time). For example, a most recent buffer entry at time k may include a convex hull of a LiDAR-detected object (e.g., cluster) at time k stored as a set of coordinates (e.g., ego vehicle coordinates). An ego vehicle may refer to a vehicle that has sensors that may detect the vehicle's surrounding environment. An adjacent buffer entry, at time k−1, may include the convex hull of the same LiDAR-detected object at time k−1. An earlier buffer entry, at time k−2, may include the convex hull of the same LiDAR-detected object at time k−2. For adjacent buffer entries, an SE transformation (e.g., an arbitrary rigid transformation) may be used as a transform between ego vehicle coordinates in the buffer at different respective times (e.g., at time k and time k−1). For buffer entries at time k to time k−n, the SE transform between ego vehicle coordinates may be a product of all delta pose entries in the buffer. When any frame is captured using LiDAR sensors, the computer system may identify the convex hull of an identified object in the frame, may store the coordinates of the convex hull in the buffer, and may remove the oldest buffer entry in some circumstances. The SE transform may indicate any location change between the oldest and newest frames (e.g., whether the identified object has moved over time). Multiplying the oldest buffer entry by the SE transform may result in an indication of what the convex hull of the identified object looks like at the current time k. Comparing the product of the oldest buffer entry and the SE transform to the newest buffer entry's convex hull should result in the same convex hull location when the object is static. In comparison, an object's centroid may change over time, indicating movement even when the object may not be moving. In this manner, the enhanced method may improve static object detection when compared with other techniques.

For example, when the location (e.g., in an multi-dimensional plane) of a convex hull at time k is represented by $C_k$, a static object hypothesis (e.g., a hypothesis that the same static hull has been static from a preceding time k−1 to time k) may suggest that applying the SE transform to the previous time entry (e.g., in the buffer) of the convex hull (e.g., $e_k SE3 e_{k-1} \times C_{k-1}$), resulting in the expected convex hull $\hat{C}_k$, should be the same as the convex hull $C_k$ at time k. The more significant the difference between $C_k$ and $\hat{C}_k$, the less likely the convex hull represents a static object. In this manner, by evaluating a convex hull at a most recent time with the same convex hull at a previous time, a system may determine whether the convex hull is part of static or moving object.

In one or more embodiments, the computer system may determine a probability that a LiDAR-detected object, whose ego vehicle coordinates at different times may be stored in the buffer, is a static object. The static object probability may be based on a feature weight matrix, which may indicate feature values of identified objects in the buffer over time. The feature values may include values for an object's area, its range from the closest point of a convex hull, its bearings (e.g., clockwise or counter clockwise to the convex hull), and the like. For example, the convex hull of a LiDAR-detected object at time k−n may be represented by ego vehicle coordinates in the buffer at time k by applying the SE transform. In this manner, the convex hull of a LiDAR-detected object at time k−n may provide a prediction k given a hypothesis that an object is static. Using the convex hull of a LiDAR-detected object at time k−n, the computer system may determine the feature values, and may generate a vector of the feature values. Based on the vector of feature values and an expected value of the vector feature values based on the static object hypothesis (e.g., an expectation that the vector feature values from a prior time entry in the buffer, adjusted appropriately to account for ego vehicle motion, have not changed), the computer system may determine a vector $d_k$, which, when multiplied by the feature weight matrix W, may provide the static object probability according to the equation:
$p(S_k|C_k,\hat{C}_k)=1/(1+\exp\{5(d_k^T W d_k - 0.5)\})$, where $p(S_k|C_k,\hat{C}_k)$ is the static object probability conditioned on the static object hypothesis prediction of $C_k$ ($\hat{C}_k$), k is time k, d is the distance/error, W is the feature weight matrix, $dk = Z_k - \mathbb{E}[Z_k|S_k]$, where $Z_k$ is the vector of features, and $\hat{C}_k = e_k SE3 e_{k-n} * C_{k-n}$. For example, when $d_k$ represents a vector of zero values (e.g., the feature vector $Z_k$ matches the expected value of $Z_k$ given the static object hypothesis), the static object probability is $1/(1+\exp\{5(0-0.5)\})$, or about 0.92, indicating a strong likelihood of a convex hull $C_k$ being static. In this manner, when the magnitude of $d_k$ increases (e.g., due to the features of the convex hull differing from the expected feature values of the convex hull), the static object probability may asymptotically approach zero.

In one or more embodiments, the computer system may determine whether the static object probability indicates a high confidence that the LiDAR detected object is static, whether static object probability indicates a low confidence that the LiDAR detected object is static, or whether the static object probability indicates that the LiDAR detected object is dynamic. In this manner, the computer system may use multiple confidence thresholds to which to compare the static object probability value.

In one or more embodiments, the buffer may be dynamic and may be updated based on the confidence with which the computer system determines that an object is static. When a new LiDAR detection (e.g., an object/cluster identified in a frame) is received by the computer system, a buffer length from time k to time k−$n_k$ may update based on $n_k$, where: $n_k = n_{dynamic}$ if and only iff (iff) $\hat{S}_{k-1}$=Dynamic (e.g., based on the confidence thresholds) AND $\|\hat{V}_{k-1}\| > \dot{V}$ (e.g., a speed estimate at time k−1 exceeds a threshold speed, providing hysteresis on the buffer length to avoid chatter); $n_k = n_{static}$ iff $\hat{S}_{k-1} \neq$ Dynamic; and $n_k = n_{k-1}$ otherwise, and where $n_{dynamic} < n_{static}$ (e.g., the buffer length is longer when an object is identified as static than when the object is identified as dynamic). The computer system may push a new detection, $D_k$, into the back of the buffer and may update the state: $e_k SE3 e_{k-n} = e_k SE3 e_{k-1} \times e_{k-1} SE3 e_{k-n}$. The computer system may drop the oldest detections, $D_{k-n}$, off the front of the buffer until a desired buffer length is achieved, and may update the state when a detection is dropped:
$m = n_{k-1}$, while $m > n_k$, $e_k SE3 e_{k-m} = e_k SE3 e_{k-m-1} \times e_{k-m} SE3^{-1} e_{k-m-1}$, and $m = m-1$.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for static object classification, in accordance with one or more example embodiments of the present disclosure.

Referring to FIG. 1, the system 100 may include a vehicle 102 (e.g., autonomously operated vehicle) with an object detection system 104 that may be operatively connected to the vehicle 102 (e.g., on top of the vehicle 102 as shown). At time k−$n_k$, the vehicle 102 may be a distance d1 behind another vehicle 106. At time k (e.g., later than time k−$n_k$), the vehicle 102 may be at a distance d2 behind the vehicle 106. The object detection system 104 may detect whether the vehicle 106 is moving or is static, and may operate based on that determination. For example, when the object detection system 104 determines that the vehicle 106 is static, the vehicle 102 may brake or move around the vehicle 106.

Still referring to FIG. 1, the object detection system 104 may include a LiDAR signal transmitter Tx 120 and a LiDAR signal sensor 122, such as Geiger mode LiDAR, ground-based LiDAR, large footprint LiDAR, small footprint LiDAR, and the like. One or more processors 132 may control the transmission of signals using the LIDAR signal transmitter 120. A buffer 134 may store LiDAR-detected data at different times (e.g., time k, time k−1, time k−2, etc.). For example, respective buffer entries may include a convex hull of LiDAR-detected data at respective times. The one or more processors 132 may identify LiDAR clusters of data based on data detected by the LiDAR signal sensor 122, and using the LiDAR clusters, may identify the convex hull of any cluster (e.g., convex hull 140 representing locations of the vehicle 106 in an X-Y-Z coordinate system). At time $k-n_k$, the one or more processors 132 may identify the convex hull 140 at time $k-n_k$. The one or more processors 132 may analyze the convex hull data stored in the buffer 134 at different times to determine whether the convex hulls indicate that the vehicle 106 is moving or is static. For example, when a SE transform is applied to the convex hull 140 at time k (e.g., $D_k=\{C_k, e_kSE3e_{k-1}\}$ for time k-1), a static object probability for the convex hull 140 may be based on features of the convex hull 140 by comparing the convex hull 140 at time k to the convex hull 140 at time $k-n_k$, as explained further herein.

Still referring to FIG. 1, at step 150, the one or more processors 132 may determine features of a convex hull in the buffer 134. For example, at time k, the convex hull 140 may be represented by $C_k$, and stored in the buffer 134 as ego coordinates at time k. Using an SE transform (e.g., SE for a 3-dimensional transform), the buffer entry at time k may be represented by $D_k$ based on the equation $D_k=\{C_k, e_kSE3e_{k-1}\}$ for time k-1. The SE transform may represent a transform between ego vehicle coordinates at times k and k-1. The convex hull 140 at time k may be represented by $\hat{C}_k$ according to the equation: $\hat{C}_k=e_kSE3e_{k-n} \times C_{k-n}$ for time k-n. In this manner, $\hat{C}_k$ may represent a prediction of $C_k$ based on a hypothesis (e.g., a prediction of $C_k$ ($\hat{C}_k$)) that the convex hull 140 (e.g., the vehicle 106) is static. Given $C_k$ and $\hat{C}_k$, the one or more processors 132 may determine features such as area of the convex hull 140, range to a closest point on the convex hull 140 (e.g., from the object detection system 104), and the extreme clockwise and counter clockwise bearings (e.g., angular bearings) to the convex hull 140. The area A of the convex hull 140 may be used to determine an entry $z_{k,1}$ of a feature vector $Z_k$, which may be represented by $z_{k,1}=(A(C_k\hat{C}k))/(\min[A(C_k), A(\hat{C}_k)])$. The range p of the convex hull 140 may be used to determine an entry $z_{k,2}$ of a feature vector $Z_k$, which may be represented by $z_{k,2}=(p_{C_k}^{min}-p_{\hat{C}_k}^{min})^2$. The extreme clockwise bearings $\beta^{CW}$ and the extreme counter clockwise bearings $\beta^{CCW}$ may be used to determine an entry $z_{k,3}$ of a feature vector $Z_k$, which may be represented by $z_{k,3}=\min[(\beta_{C_k}^{CW}-\beta_{\hat{C}_k}^{CW})^2, (\beta_{C_k}^{CCW}-\beta_{\hat{C}_k}^{CCW})^2]$. In this manner, the feature vector $Z_k$ may be represented as $$Z_k = g(C_k, \hat{C}_k) = \begin{bmatrix} z_{k,1} \\ z_{k,2} \\ z_{k,3} \end{bmatrix},$$

and the expected value $$\mathbb{E}[Z_k | S_k] = \begin{bmatrix} 1 \\ 0 \\ 0 \end{bmatrix}$$

(e.g., because the overlapping area between the convex hull at the current time and the convex hull at a prior time should be 1 because, when the object is static, the overlap is complete, and because the ranges and bearings of the convex hulls should not have changed when static). Based on $Z_k$ and the expected value of the feature vector $Z_k$ conditioned on the static object hypothesis ($\mathbb{E}[Z_k|S_k]$), the vector $d_k$ may be determined by the equation $d_k=Z_k-\mathbb{E}[Z_k|S_k]$.

At step 152, based on the LiDAR detection $d_k$ at time k, the one or more processors 132 may determine the static object probability $p(S_k|C_k, \hat{C}_k)=1/(1+\exp\{5(d_k^T Wd_k-0.5)\})$, where W may be a feature weight matrix. As explained further with respect to FIG. 4, the one or more processors 132 may determine whether the static object probability of the convex hull 140 at time k indicates a high or low level of confidence that the convex hull 140 is static, or whether the convex hull 140 is likely a dynamic object (e.g., the vehicle 106 is moving). At step 154, the one or more processors 132 may control operations (e.g., speed, direction, etc.) of the vehicle 102 based on the probability that the convex hull 140 is static. For example, when the convex hull 140 is static, the one or more processors 132 may cause the vehicle 102 to slow down and/or change directions (e.g., change driving lanes to drive around the vehicle 106).

In one or more embodiments, the one or more processors 132 may label any convex hull as static or dynamic. Using parameters of a classifier for a convex hull, such as [W, $n_{static}$, $\dot{V}$, $n_{dynamic}$, $t_{low}$, $t_{high}$] where $n_{static}$ represents a length of the buffer 134 when the convex hull 140 is static, $\dot{V}$ is a threshold velocity, $n_{dynamic}$ represents a length of the buffer 134 when the convex hull 140 is dynamic, and $t_{low}$, $t_{high}$ represent respective thresholds with which to determine the confidence that the convex hull 140 is static or dynamic (e.g., explained further with respect to FIG. 4), the one or more processors 132 may tune or optimize labeled convex hull data.

In one or more embodiments, the LIDAR signal transmitter 120 may transmit toward the vehicle 106, and the signal may reflect back as a return signal. The LIDAR signal sensor 122 may receive the return signal. Based on the time-of-flight from the time that the signal was transmitted using the LIDAR signal transmitter 120 and the LIDAR signal sensor 122, the one or more processors 132 may determine the distance d1 to the vehicle 106, and may use the distance to determine the X-Y-Z location of the convex hull 140.

In one or more embodiments, the LIDAR signal transmitter 120 may include a laser source, such as a diode laser or other type of laser, which emits optical signals. The one or more processors 132 may cause the LIDAR signal transmitter 120 to emit the optical signals. The return signals received by the LIDAR signal sensor 122 may be reflected optical signals.

In one or more embodiments, the LIDAR signal sensor 122 may include an array of photodetector pixels (not shown). The detector pixels of the LIDAR signal sensor 122 may produce an electrical pulse in response to the detection of a photon, allowing for sub-nanosecond precision photon-flight-time measurements. When a pixel is armed, the pixel may detect a low-intensity reflection of an interrogation signal (e.g., a return signal) and output a signal to be detected and subsequently used by the one or more processors 132.

In one or more embodiments, the LIDAR signal sensor 122 may function as a scanner that may detect data during a scan period such that object detection system 104 may detect the surrounding area (e.g., the vehicle 106) during a scan period. For example, a scanner used by any sensor may include a galvanometer scanner, a rotating, multi-faceted mirror, a scanning MEMS mirror, and/or a transmissive element(s) (i.e., a scanning prism, etc.) that steers optical signals via any of a number of known mechanisms including refraction, and the like.

In one or more embodiments, the object detection system 104 may scan large areas while collecting many data points, each having X-Y-Z coordinate values. The aggregation of the data points may be referred to as a point cloud data set.

The one or more processors 132 may identify object locations from the point clouds data set and use that location information for subsequent decision making (e.g., controlling the vehicle 102). The one or more processors 132 may generate a map representing an area around the vehicle 102 based on the data detected by the object detection system 104. Point cloud data sets may be collected by Geiger-mode avalanche photodiodes (e.g., the LIDAR signal sensor 122). The object detection system 104 may be mounted on movable platforms such as the vehicle 102, and/or on other movable platforms including land, sea, airborne and/or space vehicles The object detection system 104 may be configured or individually combined to sweep or scan over a large volume such that a full 360-degree environmental view may be made.

In one or more embodiments, the object detection system 104 may exhibit a number of characteristics. For example, an automotive LIDAR system may require a large field-of-view in both horizontal and vertical directions.

In one or more embodiments, object detection system 104 may exhibit a high resolution and an ability to identify a changing environment around the vehicle 102, which may be moving at a high speed. Accordingly, the one or more processors 132 may need to be able to update the generated local map of the area around the vehicle 102 at a very high frequency. The object detection system 104 may exhibit a high signal-to-noise ratio (SNR) over a wide range of ambient light conditions and the entire operating distance (i.e., scan range) of the sensors of the object detection system 104.

Figure 2:
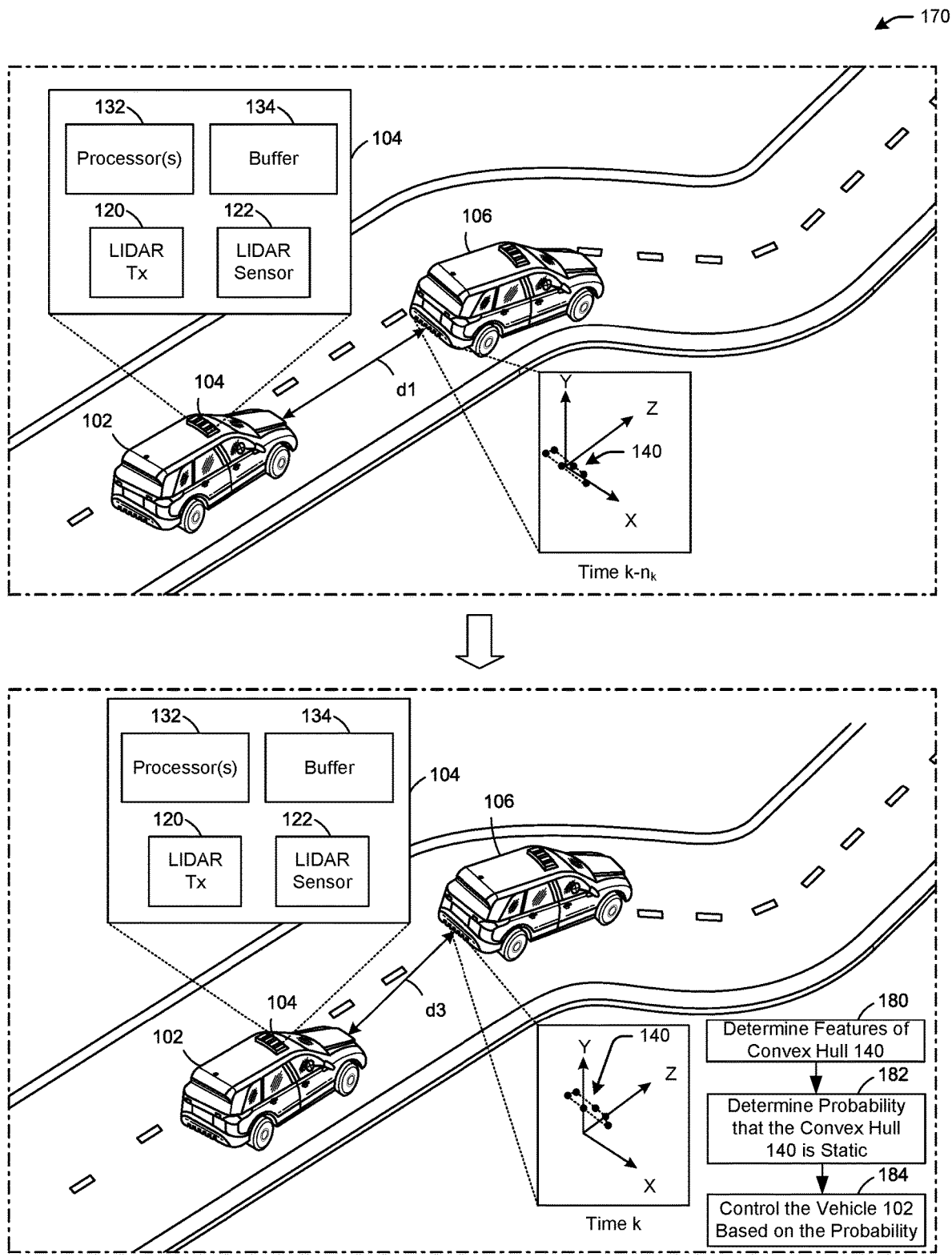
FIG. 2 illustrates an example system for static object classification, in accordance with one or more example embodiments of the present disclosure.

FIG. 2 illustrates an example system 170 for static object classification, in accordance with one or more example embodiments of the present disclosure.

Referring to FIG. 2, the system 170 may include the vehicle 102 of FIG. 1 and the vehicle 106 of FIG. 1. The object detection system 104 may detect the convex hull 140 at time $k-n_k$ and at time k. At time k in FIG. 2, the vehicle 102 may be at a distance d3 from the vehicle 106 (e.g., compared to the distance d2 of FIG. 1 at time k). At time k, the vehicle 106 may be moving, so the distance d3 may be different than the distance d2 of FIG. 1 when the vehicle 106 may be static. Accordingly, the convex hull 140 at time k may have different X-Y-Z coordinates than the convex hull 140 at time $k-n_k$. In this manner, when the object detection system 104 determines the static object probability of the convex hull 140 at time k, the static object probability may indicate that the vehicle 106 is dynamic (e.g., moving).

Still referring to FIG. 2, at step 180, the object detection system 104 may determine features of the convex hull 140. For example, at time k, the convex hull 140 may be represented by $C_k$, and stored in the buffer 134 as ego coordinates at time k. Using an SE transform (e.g., SE for a 3-dimensional transform), the buffer entry at time k may be represented by $D_k$ based on the equation $D_k=\{C_k, e_k SE3 e_{k-1}\}$ for time k-1. The SE transform may represent a transform between ego vehicle coordinates at times k and k-1. The convex hull 140 at time k may be represented by $\hat{C}_k$ according to the equation: $\hat{C}_k = e_k SE3 e_{k-n} C_{k-n}$ for time k-n. In this manner, $\hat{C}_k$ may represent a prediction of $C_k$ based on a hypothesis (e.g., a prediction of $C_k = \hat{C}_k$) that the convex hull 140 (e.g., the vehicle 106) is static. Given $C_k$ and $\hat{C}_k$, the one or more processors 132 may determine features such as area of the convex hull 140, range to a closest point on the convex hull 140 (e.g., from the object detection system 104), and the extreme clockwise and counter clockwise bearings (e.g., angular bearings) to the convex hull 140. The overlapping area A of the convex hull 140 at time k and the convex hull at a prior time applied to the SE transform may be used to determine an entry $z_{k,1}$ of a feature vector $Z_k$, which may be represented by $z_{k,1}=(A(C_k \hat{C}k))/(\min[A(C_k), A(\hat{C}_k)])$. The range p of the convex hull 140 may be used to determine an entry $z_{k,2}$ of a feature vector $Z_k$, which may be represented by $z_{k,2}=(p_{C_k}^{min}-p_{\hat{C}_k}^{min})^2$. The extreme clockwise bearings $\beta^{CW}$ and the extreme counter clockwise bearings $\beta^{CCW}$ may be used to determine an entry $z_{k,3}$ of a feature vector $Z_k$, which may be represented by $z_{k,3}=\min[(\beta_{C_k}^{CW}-\beta_{\hat{C}_k}^{CW})^2, (\beta_{C_k}^{CCW}-\beta_{\hat{C}_k}^{CCW})^2]$. In this manner, the feature vector $Z_k$ may be represented as $$Z_k = g(C_k, \hat{C}_k) = \begin{bmatrix} z_{k,1} \\ z_{k,2} \\ z_{k,3} \end{bmatrix}, \text{ and } \mathbb{E}[Z_k | S_k] = \begin{bmatrix} 1 \\ 0 \\ 0 \end{bmatrix}.$$

Based on $Z_k$ and the expected value of the feature vector $Z_k$ conditioned on the static object hypothesis (e.g., $\mathbb{E}[Z_k|S_k]$), the vector $d_k$ may be determined by the equation $d_k = Z_k - \mathbb{E}[Z_k|S_k]$.

At step 182, based on the LiDAR detection $d_k$ at time k, the object detection system 104 may determine the static object probability $p(S_k|C_k, \hat{C}_k)=1/(1+\exp\{5(d_k^T W d_k - 0.5)\})$, where W may be a feature weight matrix. As explained further with respect to FIG. 4, the one or more processors 132 may determine whether the static object probability of the convex hull 140 at time k indicates a high or low level of confidence that the convex hull 140 is static, or whether the convex hull 140 is likely a dynamic object (e.g., the vehicle 106 is moving). At step 184, the object detection system 104 may control operations (e.g., speed, direction, etc.) of the vehicle 102 based on the probability that the convex hull 140 is static. For example, when the convex hull 140 is dynamic, the object detection system 104 may cause the vehicle 102 to continue driving at a current speed, change speeds and/or directions, and/or the like.

Figure 3:
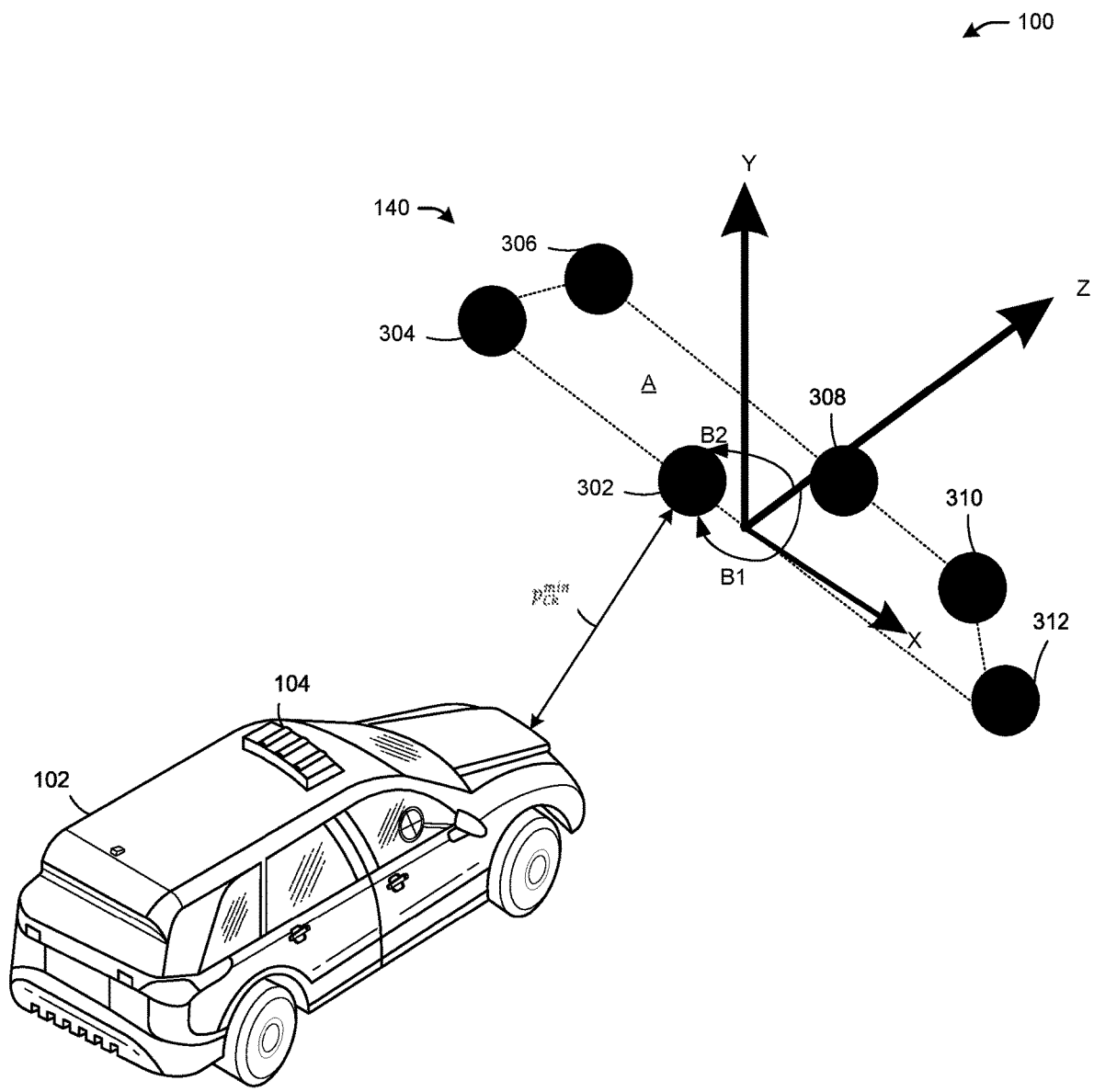
FIG. 3 illustrates an example system for static object classification, in accordance with one or more example embodiments of the present disclosure.

FIG. 3 illustrates the example system 100 for static object classification of FIG. 1, in accordance with one or more example embodiments of the present disclosure.

Referring to FIG. 3, the system 100 is shown with the features of the convex hull 140 of FIG. 1 (e.g., for times k and/or $k-n_k$). For example, the overlapping area A of the convex hull 140 at different times (e.g., the amount of area of the convex hull 140 at time k overlapping the area of the convex hull 140 at time $k-n_k$, which should be 100% when the convex hull 140 is static) represents the amount of overlap of the physical area of the LiDAR data points (e.g., data point 302, data point 304, data point 306, data point 308, data point 310, data point 312) of the convex hull 140 at different times. The range $p_{C_k}^{min}$ (for $C_k$, or the range $p_{\hat{C}_k}^{min}$ for $\hat{C}_k$) is shown to represent the range between the vehicle 106 (e.g., the object detection system 104) and the closest data point on the convex hull 140 (e.g., data point 302 as determined by the object detection system 104). When the convex hull 140 is static, the range at time k and the range at time $k-n_k$ may be different based on the velocity (e.g., speed and direction) of the vehicle 102. The extreme clockwise bearing to the convex hull 140, $\beta_{C_k}^{CW}$ (for $C_k$, or $\beta_{\hat{C}_k}^{CW}$ for $\hat{C}_k$), is represented by an angle B1 in FIG. 3, as a bearing determined by a clockwise angular rotation from the Z-axis. The extreme counter clockwise bearing to the convex hull 140, $\beta_{C_k}^{CCW}$ (for $C_k$, or $\beta_{\hat{C}_k}^{CCW}$ for $\hat{C}_k$), is represented by an angle B2 in FIG. 3, as a bearing determined by a counter clockwise angular rotation from the Z-axis. The range may be determined based on the closest point on the convex hull 140 (e.g., the data point 302 as shown). The extreme bearings may not change from time k to time $k-n_k$ when the convex hull 140 is static. In this manner, by determining feature vector Z and times k and $k-n_k$, the object detection system 104 of FIG. 1 may determine whether the convex hull 140 is static based one any difference between the feature vector at time k and the expected feature vector at time k based on the feature vector at time $k-n_k$.

In one or more embodiments, the object detection system 104 may determine features of the convex hull 140. For example, at time k, the convex hull 140 may be represented by $C_k$ at time k. Using an SE transform (e.g., SE for a 3-dimensional transform), a buffer entry at time k may be represented by $D_k$ based on the equation $D_k=\{C_k, e_k SE3 e_{k-1}\}$ for time k−1. The SE transform may represent a transform between ego vehicle coordinates at times k and k−1. The convex hull 140 at time k may be represented by $\hat{C}_k$ according to the equation: $\hat{C}_{k-n}=e_k SE3 e_{k-n} \times C_{k-n}$ for time k−n. In this manner, $\hat{C}_k$ may represent a prediction of $C_k$ based on a hypothesis that the convex hull 140 (e.g., the vehicle 106) is static (e.g., a prediction of $C_k=\hat{C}_k$, where $\hat{C}_k$ represents a prediction of the convex hull at a prior time based on the application of the SE transform). Given $C_k$ and $\hat{C}_k$, the object detection system 104 may determine features such as overlapping area of the convex hull 140 at the most recent time (e.g., time k) and a previous time (e.g., time k−1), range to a closest point on the convex hull 140 (e.g., from the object detection system 104, which should not change from time k−1 to time k when the object is static), and the extreme clockwise and counter clockwise bearings (e.g., angular bearings, which should not change from time k−1 to time k when the object is static) to the convex hull 140. The overlapping area A of the convex hull 140 may be used to determine an entry $z_{k,1}$ of a feature vector $Z_k$, which may be represented by $z_{k,1}=(A(C_k \hat{C}_k))/(\min[A(C_k), A(\hat{C}_k)])$. Because the convex hull 140 may be considered a polygon, the area equation for $z_{k,1}$ may represent an area overlap for $C_k$ and $\hat{C}_k$, divided by an area of a smaller polygon (e.g., based on the smaller of the area of $C_k$ and the area of $\hat{C}_k$). The range p of the convex hull 140 may be used to determine an entry $z_{k,2}$ of a feature vector $Z_k$, which may be represented by $z_{k,2}=(p_{C_k}^{min}-p_{\hat{C}_k}^{min})^2$. The extreme clockwise bearings $\beta^{CW}$ and the extreme counter clockwise bearings $\beta^{CCW}$ may be used to determine an entry $z_{k,3}$ of a feature vector $Z_k$, which may be represented by $z_{k,3}=\min[(\beta_{C_k}^{CW}-\beta_{\hat{C}_k}^{CW})^2, (\beta_{C_k}^{CCW}-\beta_{\hat{C}_k}^{CCW})^2]$. In this manner, the feature vector $Z_k$ may be represented as $$Z_k = g(C_k, \hat{C}_k) = \begin{bmatrix} z_{k,1} \\ z_{k,2} \\ z_{k,3} \end{bmatrix}, \text{ and } \mathbb{E}[Z_k | S_k] = \begin{bmatrix} 1 \\ 0 \\ 0 \end{bmatrix}.$$

Based on $Z_k$ and the expected value of the feature vector $Z_k$ conditioned on the static object hypothesis ($\mathbb{E}[Z_k|S_k]$), the value $d_k$ may be determined by the equation $d_k=Z_k-\mathbb{E}[Z_k|S_k]$.

Based on the LiDAR detection $d_k$ at time k, the object detection system 104 may determine the static object probability $p(S_k|C_k, \hat{C}_k)=1/(1+\exp\{5(d_k^T W d_k-0.5)\})$, where W may be a feature weight matrix. As explained further with respect to FIG. 4, the object detection system 104 may determine whether the static object probability of the convex hull 140 at time k indicates a high or low level of confidence that the convex hull 140 is static, or whether the convex hull 140 is likely a dynamic object (e.g., the vehicle 106 is moving). The object detection system 104 may control operations (e.g., speed, direction, etc.) of the vehicle 102 based on the probability that the convex hull 140 is static.

Figure 4:
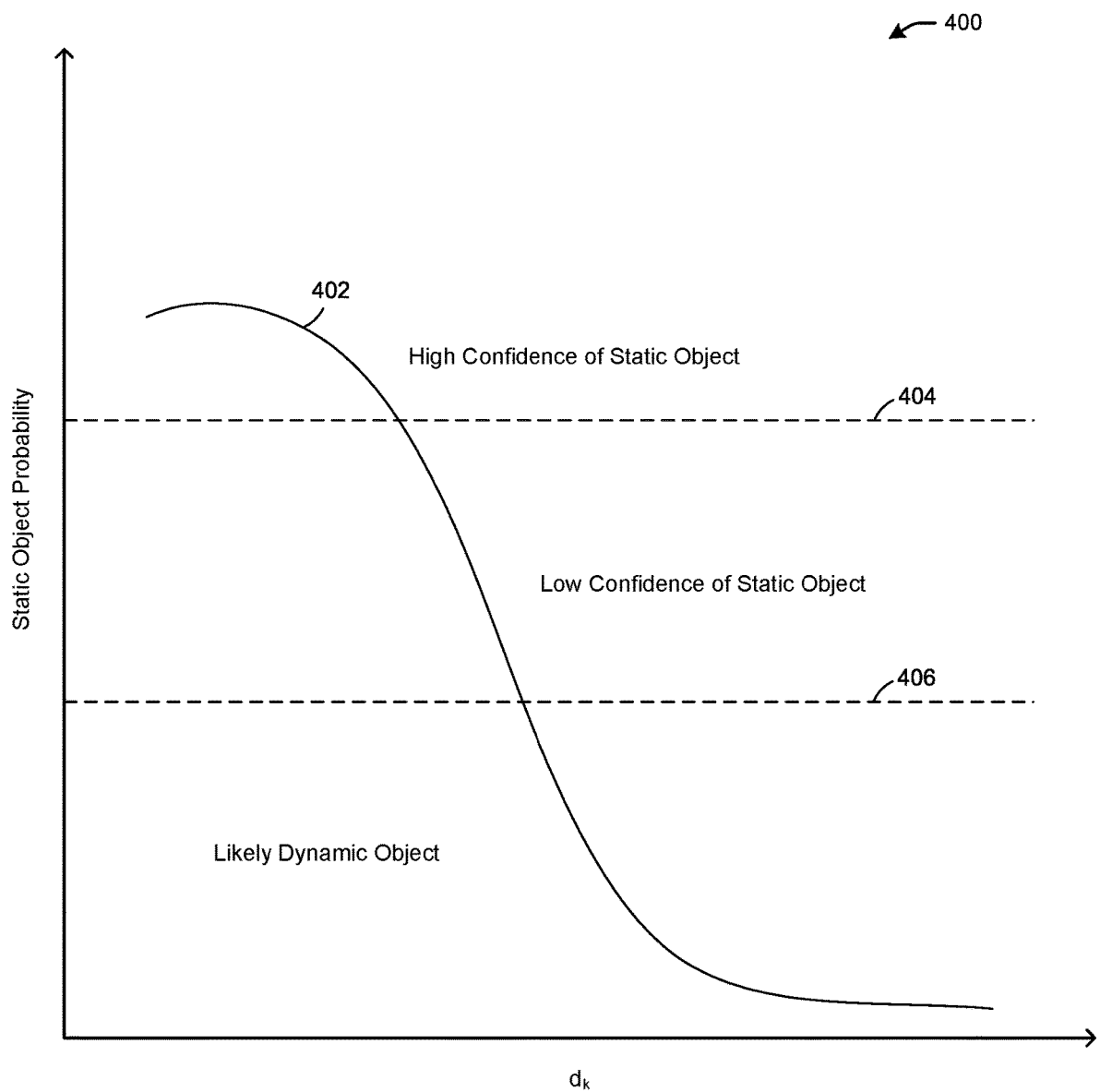
FIG. 4 illustrates an example graph showing static object probability for static object classification, in accordance with one or more example embodiments of the present disclosure.

FIG. 4 illustrates an example graph 400 showing static object probability for static object classification, in accordance with one or more example embodiments of the present disclosure.

Referring to FIG. 4, the graph 400 shows a static object probability 402 for a given convex hull (e.g., the convex hull 140 of FIG. 1) buffer entry (e.g., the convex hull multiplied by a SE transform between ego coordinates of an object, such as the vehicle 106 of FIG. 1). The graph 400 shows threshold 404 (e.g., $t_{high}$) and threshold 406 (e.g., $t_{low}$) at different respective static object probability levels. When the object detection system 104 of FIG. 1 determines that a convex hull $d_k$ buffer entry is above the threshold 404, the object detection system 104 may determine with a high confidence level that the convex hull is a static object. When the object detection system 104 determines that a convex hull $d_k$ buffer entry is below the threshold 406, the object detection system 104 may determine that the convex hull is a dynamic object. When the object detection system 104 determines that a convex hull $d_k$ buffer entry is between the threshold 406 and the threshold 404, the object detection system 104 may determine with a low confidence level that the convex hull is a static object. Represented mathematically, $\hat{S}_k$=static object with high confidence iff $p(S_k|C_k, \hat{C}_k) > t_{high}$; $\hat{S}_k$=static object with low confidence iff $p(S_k|C_k, \hat{C}_k) \in [t_{low}, t_{high}]$; and $\hat{S}_k$=dynamic object iff $p(S_k|C_k, \hat{C}_k) < t_{low}$. As explained further with respect to FIG. 5, a buffer length may be dynamic and may depend on the static/dynamic object determination $\hat{S}_k$.

Figure 5:
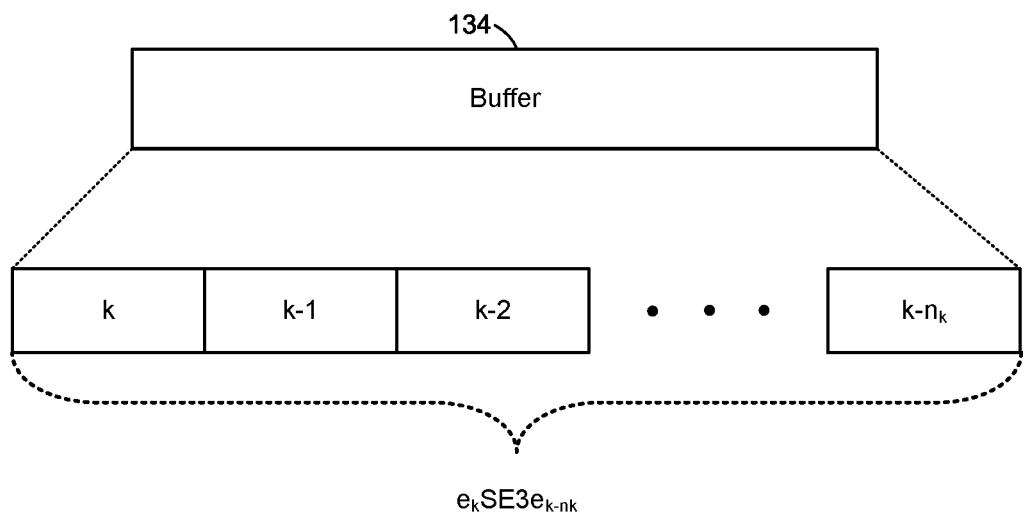
FIG. 5 illustrates the buffer of the system for static object classification of FIG. 1, in accordance with one or more example embodiments of the present disclosure.

FIG. 5 illustrates the buffer 134 of the system 100 for static object classification of FIG. 1, in accordance with one or more example embodiments of the present disclosure.

Referring to FIG. 5, the buffer 134 may have multiple slots from time k to time $k-n_k$. A respective slot may store LiDAR detections tagged with a single-frame of ego coordinates. Adjacent buffer entries (e.g., time k and time k−1) may provide a delta pose between the adjacent buffer entries. For example, the entry of the slot for time k−1 may be represented by: $D_{k-1}=\{C_{k-1}, e_{k-1} SE3 e_{k-2}\}$ where SE3 represents a 3-dimensional SE transform between ego coordinates at times k−1 and k−2. The SE transform may be a transform between a current time and a most prior time in the buffer 134, and may be multiplied for each transition from one entry to the next entry, from the first to the last frame in the buffer 134. The buffer 134 may maintain a SE transform between ego vehicle coordinates for the entire length of the buffer 134 from time k to time $k-n_k$. The SE transform from the first to the last entry of the buffer 134 may be a product of all delta pose entries (e.g., a product of the transforms from each adjacent entry): $e_k SE3 e_{k-nk}$. The SE transform indicates a coordinate change from the oldest frame in the buffer 134 (e.g., the frame stored in the time $k-n_k$ entry) to the newest frame in the buffer 134 (e.g., the frame stored in the time k entry). The SE transform multiplied by the oldest entry in the buffer 134 may represent what a convex hull (e.g., the convex hull 140 of FIG. 1) looks like at the current time k. When compared with the newest convex hull entry in the buffer 134 at time k, the SE transform applied to the oldest buffer entry should look the same as the newest buffer entry when an object is static. In this manner, static object classification may be improved over some techniques relying on centroids, as centroids may change over time, indicating that an object is dynamic when it may not be.

In one or more embodiments, the buffer 134 size may be dynamic, and may be adjusted automatically to facilitate fast detections from dynamic to static while avoiding false classification of slow-moving objects as static. When a new LiDAR detection is received (e.g., by the object detection system 104 of FIG. 1), the length of the buffer 134 may be updated based on the determination of whether the detection represents a dynamic object or a static object. For example, when $\hat{S}_{k-1} < t_{low}$ of FIG. 4, the object may be considered dynamic. If, and only if, $\hat{S}_{k-1}$ (e.g., the most recent entry of the buffer 134 prior to the new detection) is dynamic and a speed estimate of the object at time k−1 ($\hat{V}_{k-1}$)>a speed threshold ($\hat{V}$), then the length of the buffer 134, represented by nk, may be adjusted to a dynamic buffer length $n_{dynamic}$. Mathematically, the dynamic buffer length may be represented by: $n_k = n_{dynamic}$ iff $\hat{S}_{k-1}$=Dynamic AND $\|\hat{V}_{k-1}\| > \hat{V}$. When $\hat{S}_{k-1} \geq t_{low}$ of FIG. 4, the object may be considered static (with high or low confidence). If, and only if, $\hat{S}_{k-1} \neq$ Dynamic, the buffer length $n_k$ may be adjusted to a static buffer length $n_{static}$. Otherwise, the buffer length $n_k$ may be set to the length of $n_{k-1}$ (e.g., the oldest entry of the buffer 134 may be dropped/deleted). In this manner, when the newest buffer entry is static, the length of the buffer 134 may grow by adding the newest entry. When the newest entry is dynamic, the buffer length may not grow, so $n_{dynamic} < n_{static}$.

In one or more embodiments, when a new detection $D_k$ is received (e.g., by the object detection system 104 of FIG. 1), the object detection system 104 may push the new detection $D_k$ to the back of the buffer 134, and may update the state: $e_k SE3 e_{k-n} = e_k SE3 e_{k-1} \times e_{k-1} SE3 e_{k-n}$. In this manner, the product of the delta pose of entries from time k to time k−n may be the product of the delta pose for entries at times k and k−1 and the delta pose for entries at times k−1 and k−n. The oldest detection $D_{k-n}$ may be removed from the buffer 134 until the desired buffer length is achieved, and the state may be updated whenever a detection is removed from the buffer 134 according to the following algorithm:
set m=$n_{k-1}$,
while m>$n_k$:
$e_k SE3 e_{k-m} = e_{k-m-1} \times e_{k-m} SE3^{-1} e_{k-m-1}$
m=m−1.

Figure 6:
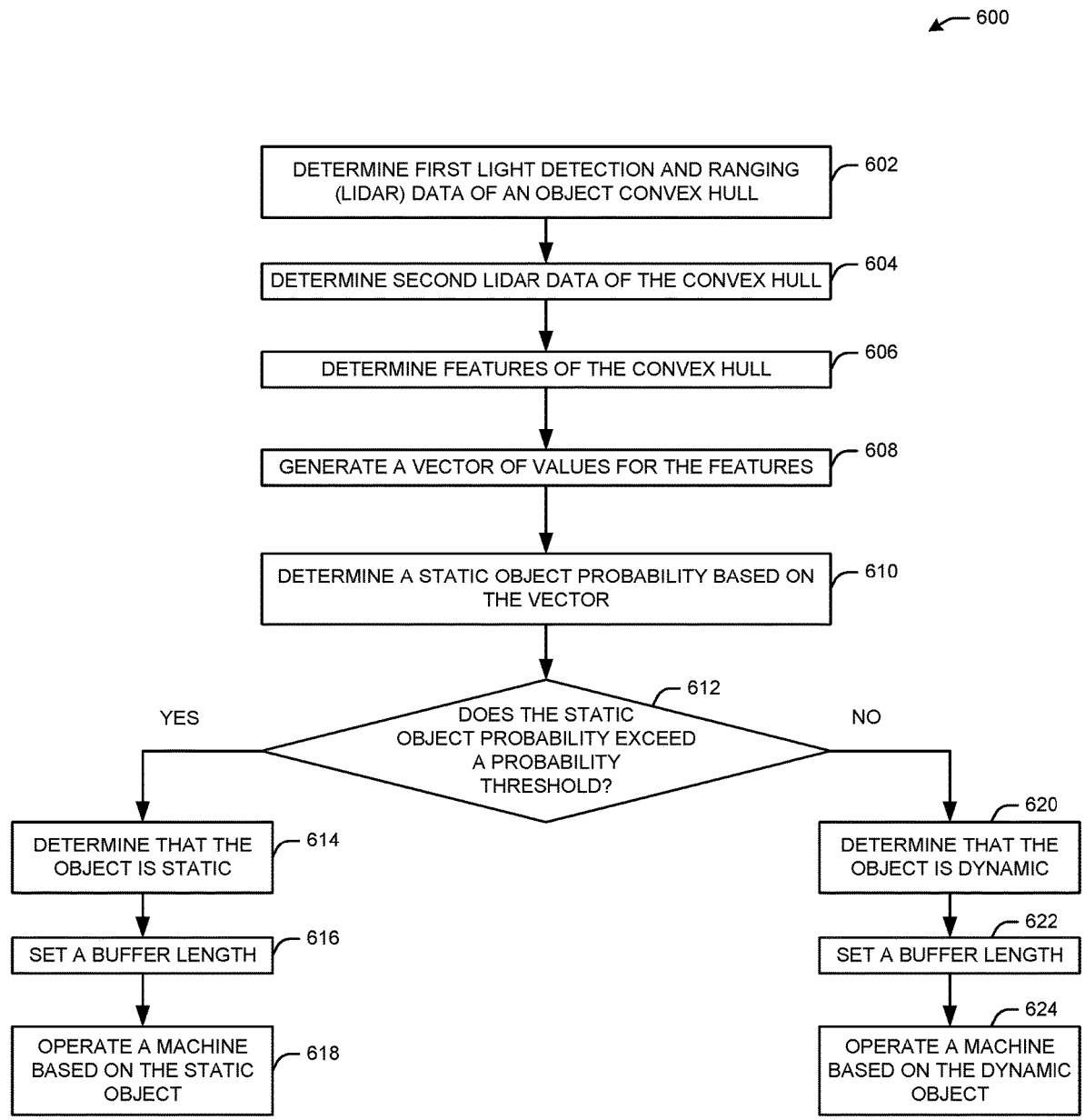
FIG. 6 illustrates an example flow diagram for a process for static object classification, in accordance with one or more example embodiments of the present disclosure.

FIG. 6 illustrates a flow diagram for a process 600 for static object classification, in accordance with one or more example embodiments of the present disclosure.

At block 602, a system (e.g., the object detection system 104 of FIG. 1) may determine first LiDAR data of a convex hull (e.g., the convex hull 140 of FIG. 1) associated with a detected object (e.g., the vehicle 106 of FIG. 1) at a first time (e.g., time k−1). The system may detect, using the first LiDAR data, a cluster of LiDAR data points associated with the object, and may identify a convex hull of the object based on the data points. The first LiDAR data and convex hull may be stored in a buffer and may represent a frame of LiDAR data corresponding to the first time.

At block 604, the system may determine second LiDAR data of the convex hull, representing the convex hull at a second time (e.g., time k). The second LiDAR data may be a most recent LiDAR detection of the convex hull. Both the first and second detections of the LiDAR data representing the convex hull may be stored in the buffer. When the first and second LiDAR detections represent adjacent buffer entries (e.g., for times k and time k−1), a SE transform may be applied between the ego coordinates of the convex hull at time k and the ego coordinates of the convex hull at time k−1. Based on an assumption that the convex hull is static, the second LiDAR data at time k should be the same as the convex hull at time k−1 applied to the SE transform. In this manner, the convex hull $C_k$ should be the same as the convex hull $\hat{C}_k$, where $\hat{C}_k = e_k SE3 e_{k-1} \times C_{k-1}$ (e.g., the SE transform applied to the convex hull at time $C_{k-1}$ should be the same as the convex hull at time k, $C_k$). The degree (e.g., confidence level) to which the system may classify the object as static may depend on the difference(s) between features of the convex hull at the first and second times.

At block 606, the system may determine features of the convex hull. For example, given the convex hull $C_k$ and the expected convex hull $\hat{C}_k$, the system may determine an area, a range to a closest point on the convex hull, and the extreme clockwise and/or counter clockwise bearings to the convex hull. The area feature of the convex hull may be represented by $(A(C_k \hat{C}k))/(\min[A(C_k), A(\hat{C}_k)])$. The range feature p of the convex hull may be represented by $(p_{C_k}^{min} - p_{\hat{C}_k}^{min})^2$. The extreme clockwise bearings $\beta^{CW}$ and the extreme counter clockwise bearings $\beta^{CCW}$ may be represented by min $[(\beta_{C_k}^{CW} - \beta_{\hat{C}_k}^{CW})^2, (\beta_{C_k}^{CCW} - \beta_{\hat{C}_k}^{CW})^2]$.

At block 608, the system may determine a feature vector $Z_k$ of the feature values calculated at block 606. For example, the area feature may be represented by $z_{k,1}$, a first value of the feature vector. The range feature may be represented by $z_{k,2}$, a second value of the feature vector. The bearings value(s) may be represented by $z_{k,3}$, a third value of the feature vector. In this manner, the feature vector $Z_k$ may be represented as $$Z_k = g(C_k, \hat{C}_k) = \begin{bmatrix} z_{k,1} \\ z_{k,2} \\ z_{k,3} \end{bmatrix},$$

and an expected value of the feature vector at time k may be $$\mathbb{E}[Z_k | S_k] = \begin{bmatrix} 1 \\ 0 \\ 0 \end{bmatrix}.$$

Based on $Z_k$ and the expected value of the feature vector $Z_k$ conditioned on the static object hypothesis ($\mathbb{E}[Z_k|S_k]$), a value $d_k$ may be determined by the equation $d_k = Z_k - \mathbb{E}[Z_k|S_k]$. When the object is static, $d_k$ may be zero or close to zero.

At block 610, the system may determine a static object probability (e.g., a probability that the object represented by the convex hull is static). The probability may be determined according to the equation:
$p(S_k|C_k,\hat{C}_k) = 1/(1+\exp\{5(d_k^T W d_k - 0.5)\})$, where $p(S_k|C_k,\hat{C}_k)$ is the static object probability conditioned on the static object hypothesis prediction of $C_k$ ($\hat{C}_k$), k is time k, d is the distance/error, W is the feature weight matrix, $dk = Z_k - \mathbb{E}[Z_k|S_k]$, where $Z_k$ is the vector of features, and $\hat{C}_k = e_k SE3 e_{k-n} * C_{k-n}$. The feature weight matrix W may include weighted values for the respective features of the feature vector $Z_k$. For example, when $d_k$ represents a vector of zero values (e.g., the feature vector $Z_k$ matches the expected value of $Z_k$ given the static object hypothesis), the static object probability is $1/(1+\exp\{5(0-0.5)\})$, or about 0.92, indicating a strong likelihood of a convex hull $C_k$ being static. In this manner, when the magnitude of $d_k$ increases (e.g., due to the features of the convex hull differing from the expected feature values of the convex hull), the static object probability may asymptotically approach zero.

At block 612, the system may determine whether the static object probability exceeds a probability threshold (e.g., threshold 406 of FIG. 4, or $t_{low}$). The threshold may be indicative of a confidence level that the object is likely or unlikely to be static. When the system determines that the static object probability exceeds the threshold, the system may consider the convex hull as associated with a static object at block 614, and, at block 616, may set the length of a buffer (e.g., the buffer 134 of FIG. 1) accordingly. For example, the system may extend the length of the buffer when the latest LiDAR data (e.g., the second LiDAR data) indicates a static object. At block 618, the system may control the operation of a machine (e.g., the vehicle 102 of FIG. 1) based on the static object classification. For example, when the convex hull is associated with an object (e.g., the vehicle 106 of FIG. 1) and the object is classified as static (e.g., a stopped/parked vehicle), the system may cause the machine to change speed and/or direction (e.g., decelerate, drive around the static object, etc.).

When the system determines that the static object probability does not exceed the threshold at block 612, the system may proceed to block 620 and may classify the convex hull as associated with a dynamic object. Based on the dynamic object classification, the system may, at block 622, set the buffer length (e.g., by reducing the buffer length). At block 624, the system may control the operation of a machine (e.g., the vehicle 102 of FIG. 1) based on the dynamic object classification. For example, the system may cause the machine to maintain or change speeds and/or directions.

Figure 7:
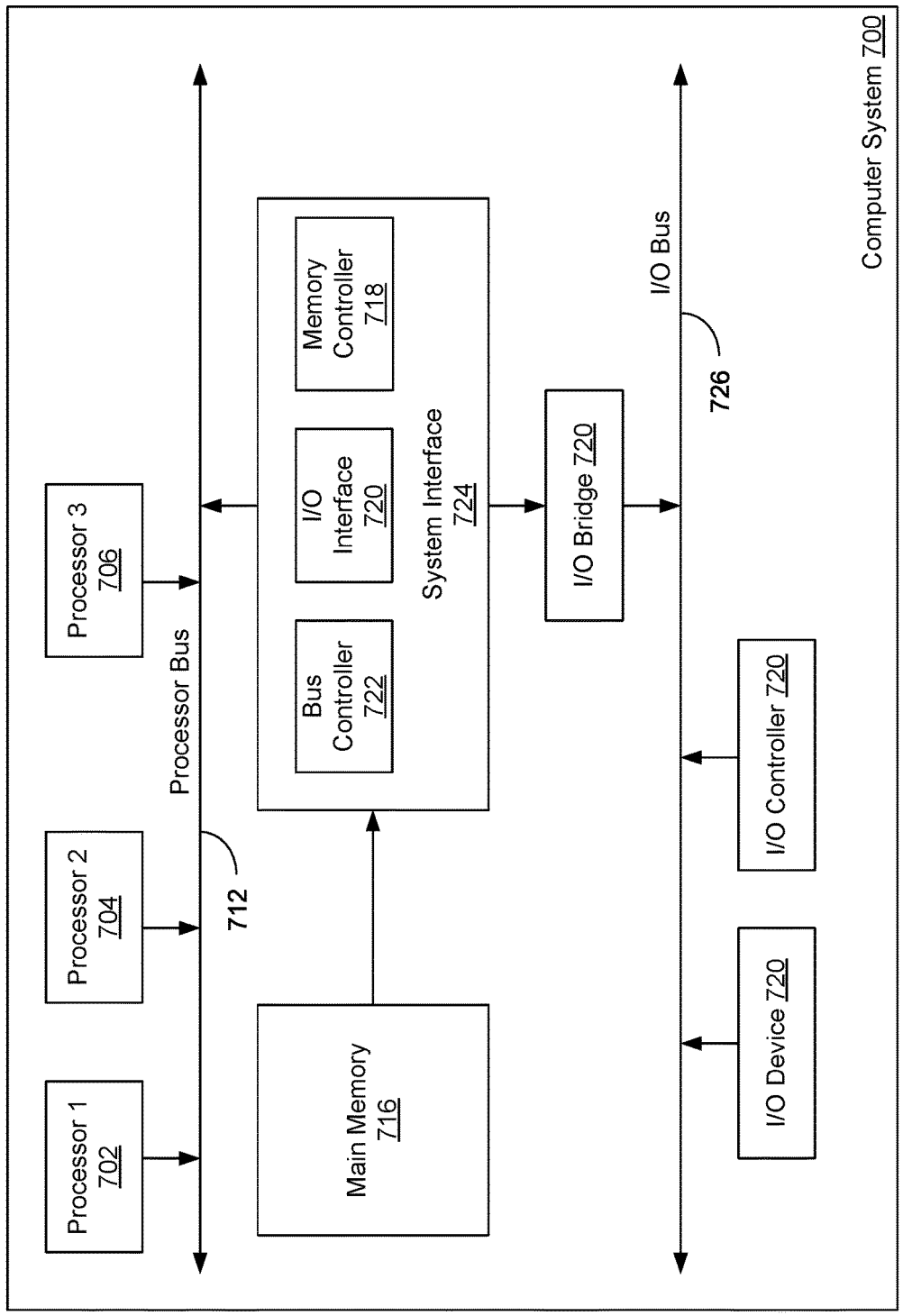
FIG. 7 is a block diagram illustrating an example of a computing device or computer system upon which any of one or more techniques (e.g., methods) may be performed, in accordance with one or more example embodiments of the present disclosure.

FIG. 7 is a block diagram illustrating an example of a computing device or computer system 700 upon which any of one or more techniques (e.g., methods) may be performed, in accordance with one or more example embodiments of the present disclosure.

For example, the computing system 700 of FIG. 7 may represent the one or more processors 132, or the object detection system 104 of FIG. 1. The computer system (system) includes one or more processors 702-706. Processors 702-706 may include one or more internal levels of cache (not shown) and a bus controller 722 or bus interface unit to direct interaction with the processor bus 712. Processor bus 712, also known as the host bus or the front side bus, may be used to couple the processors 702-706 with the system interface 714. System interface 724 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system outlined in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

In some aspects of the disclosure, a method for classifying objects as static or dynamic may include determining, by at least one processor of a device, first LiDAR data associated with a convex hull of an object at a first time. The method may include determining, by the at least one processor, second LiDAR data associated with the convex hull at a second time after the first time. The method may include generating, by the at least one processor, based on the first LiDAR data and the second LiDAR data, a vector comprising values of features associated with the convex hull. The method may include determining, by the at least one processor, based on the vector, a probability that the object is static. The method may include causing operation, by the at least one processor, of a machine based on the probability that the object is static.

In some aspects of the disclosure, the method for classifying objects as static or dynamic may include determining an expected value associated with the vector, wherein determining the probability that the object is static is further based on the expected value associated with the vector.

In some aspects of the disclosure, the method for classifying objects as static or dynamic may include determining a transform between the first LiDAR data and the second LIDAR data, wherein generating the vector is further based on the transform.

In some aspects of the disclosure, the features for the method for classifying objects as static or dynamic may include an area associated with the first LiDAR data and the second LiDAR data.

In some aspects of the disclosure, the features for the method for classifying objects as static or dynamic may include a range between the machine and a data point of the convex hull.

In some aspects of the disclosure, the features for the method for classifying objects as static or dynamic may include angular bearings associated with a data point of the convex hull.

In some aspects of the disclosure, the method for classifying objects as static or dynamic may include setting a length of a buffer based on the probability that the object is static; and storing the second LIDAR data in the buffer.

In some aspects of the disclosure, the method for classifying objects as static or dynamic may include determining that the probability that the object is static exceeds a probability threshold, wherein setting the length of the buffer includes extending a previous length of the buffer based on the determination that the probability that the object is static exceeds the probability threshold.

In some aspects of the disclosure, the causing of the operation of the machine for the method for classifying objects as static or dynamic may include setting a driving speed of an autonomous vehicle.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for classifying objects as static or dynamic, the method comprising:
   determining, by at least one processor of a device, first light detection and ranging (LIDAR) data associated with a convex hull of an object at a first time;
   determining, by the at least one processor, second LIDAR data associated with the convex hull at a second time after the first time;
   generating, by the at least one processor, based on the first LIDAR data and the second LIDAR data, a vector comprising values of features associated with the convex hull;
   determining, by the at least one processor, based on the vector, a probability that the object is static;
   setting, by the at least one processor, based on the probability that the object is static, a length of a buffer that stores the second LIDAR data; and
   causing operation, by the at least one processor, of a machine based on the probability that the object is static.

2. The method of claim 1, further comprising determining an expected value associated with the vector, wherein determining the probability that the object is static is further based on the expected value associated with the vector.

3. The method of claim 1, further comprising determining a transform between the first LIDAR data and the second LIDAR data, wherein generating the vector is further based on the transform.

4. The method of claim 1, wherein the features comprise an area associated with the first LIDAR data and the second LIDAR data.

5. The method of claim 1, wherein the features comprise a range between the machine and a data point of the convex hull.

6. The method of claim 1, wherein the features comprise angular bearings associated with a data point of the convex hull.

7. The method of claim 1, further comprising determining that the probability that the object is static exceeds a probability threshold, wherein setting the length of the buffer comprises extending a previous length of the buffer based on the determination that the probability that the object is static exceeds the probability threshold.

8. The method of claim 1, wherein causing operation of the machine comprises setting a driving speed of an autonomous vehicle.

9. A system for classifying objects as static or dynamic, the system comprising at least one processor coupled to memory, the at least one processor configured to:
   determine first light detection and ranging (LIDAR) data associated with a convex hull of an object at a first time;
   determine second LIDAR data associated with the convex hull at a second time after the first time;
   generate, based on the first LIDAR data and the second LIDAR data, a vector comprising values of features associated with the convex hull;
   determine, based on the vector, a probability that the object is static;
   set, based on the probability that the object is static, a length of a buffer that stores the second LIDAR data; and
   cause operation of a machine based on the probability that the object is static.

10. The system of claim 9, wherein the at least one processor is further configured to determine an expected value associated with the vector, wherein to determine the probability that the object is static is further based on the expected value associated with the vector.

11. The system of claim 9, wherein the at least one processor is further configured to determine a transform between the first LIDAR data and the second LIDAR data, wherein to generate the vector is further based on the transform.

12. The system of claim 9, wherein the at least one processor is further configured to determine that the probability that the object is static exceeds a probability threshold, wherein to set the length of the buffer comprises to extend a previous length of the buffer based on the determination that the probability that the object is static exceeds the probability threshold.

13. The system of claim 9, wherein to cause operation of the machine comprises to set a driving speed of an autonomous vehicle.

14. The system of claim 9, wherein the at least one processor is further configured to determine at least one of:
   an area associated with the first LIDAR data and the second LIDAR data,
   a range between the machine and a data point of the convex hull, or
   angular bearings associated with the data point of the convex hull,
   wherein generating the vector is further based on at least one of the area, the range, or the angular bearings.

15. A non-transitory computer-readable medium having instructions stored thereon that, when executed by at least one computing device, causes the at least one computing device to perform operations for classifying objects as static or dynamic, the operations comprising:
   determining first light detection and ranging (LIDAR) data associated with a convex hull of an object at a first time;
   determining second LIDAR data associated with the convex hull at a second time after the first time;
   storing the second LIDAR data in the buffer;
   generating, based on the first LIDAR data and the second LIDAR data, a vector comprising values of features associated with the convex hull;
   determining, based on the vector, a probability that the object is static;
   setting, based on the probability that the object is static, a length of a buffer that stores the second LIDAR data; and
   causing operation of a machine based on the probability that the object is static.

16. The non-transitory computer-readable medium of claim 15, wherein the operations further comprising determining an expected value associated with the vector, wherein the determining the probability that the object is static is further based on the expected value associated with the vector.

17. The non-transitory computer-readable medium of claim 15, wherein the first LIDAR data is stored in the buffer, wherein the operations further comprising determining a transform between the first LIDAR data and the second LIDAR data, wherein the generating the vector is further based on the transform.

18. The non-transitory computer-readable medium of claim 15, the operations further comprising determining that the probability that the object is static exceeds a probability threshold, wherein the setting the length of the buffer comprises extending a previous length of the buffer based on the determination that the probability that the object is static exceeds the probability threshold.

19. The non-transitory computer-readable medium of claim 15, wherein the causing operation of the machine comprises setting a driving speed of an autonomous vehicle.

20. The non-transitory computer-readable medium of claim 15, the operations further comprising determining at least one of:
- an area associated with the first LIDAR data and the second LIDAR data,
- a range between the machine and a data point of the convex hull, or
- angular bearings associated with the data point of the convex hull,
- wherein the generating the vector is further based on at least one of the area, the range, or the angular bearings.

* * * * *